United States Patent Office 3,101,446
Patented Aug. 20, 1963

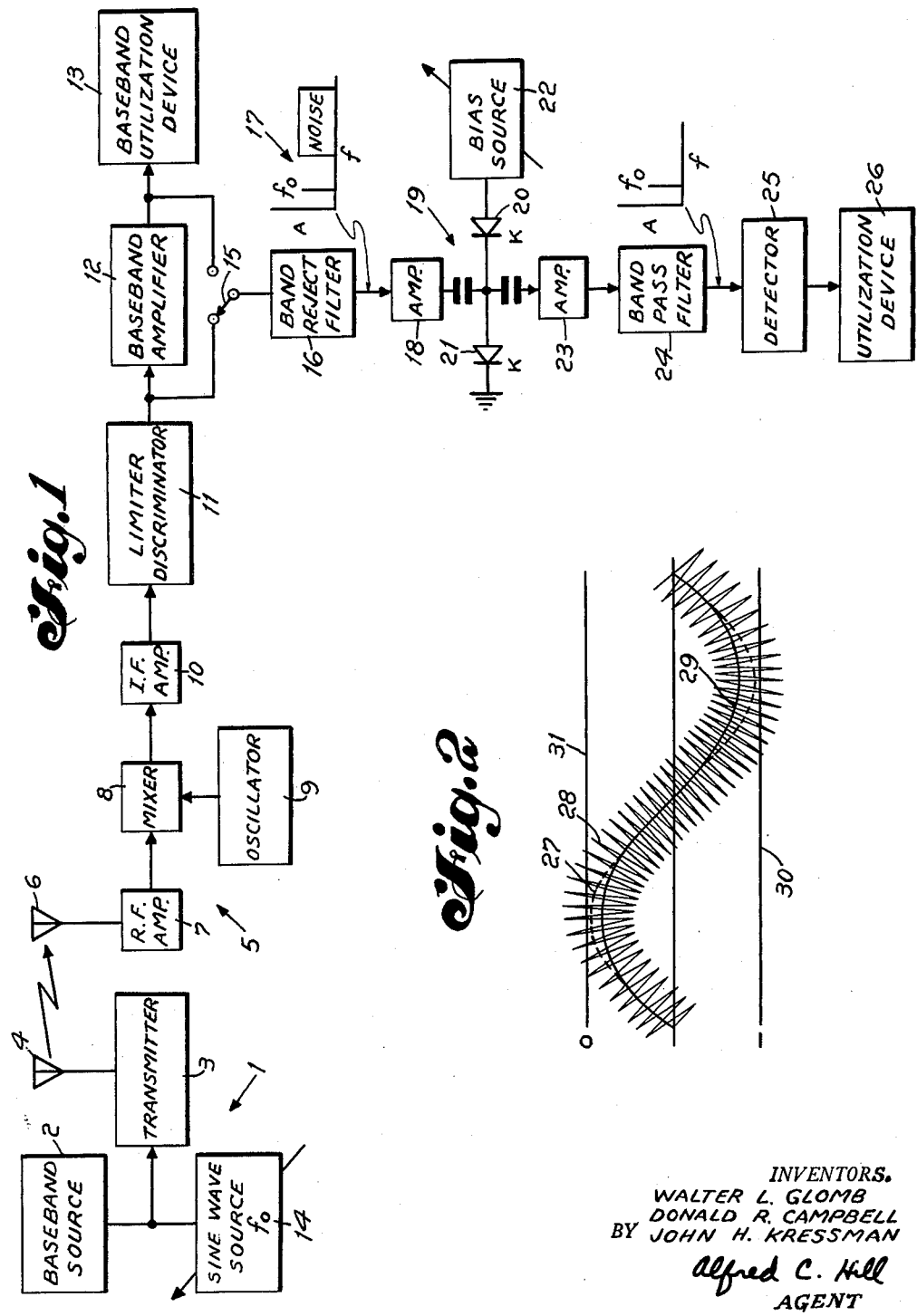

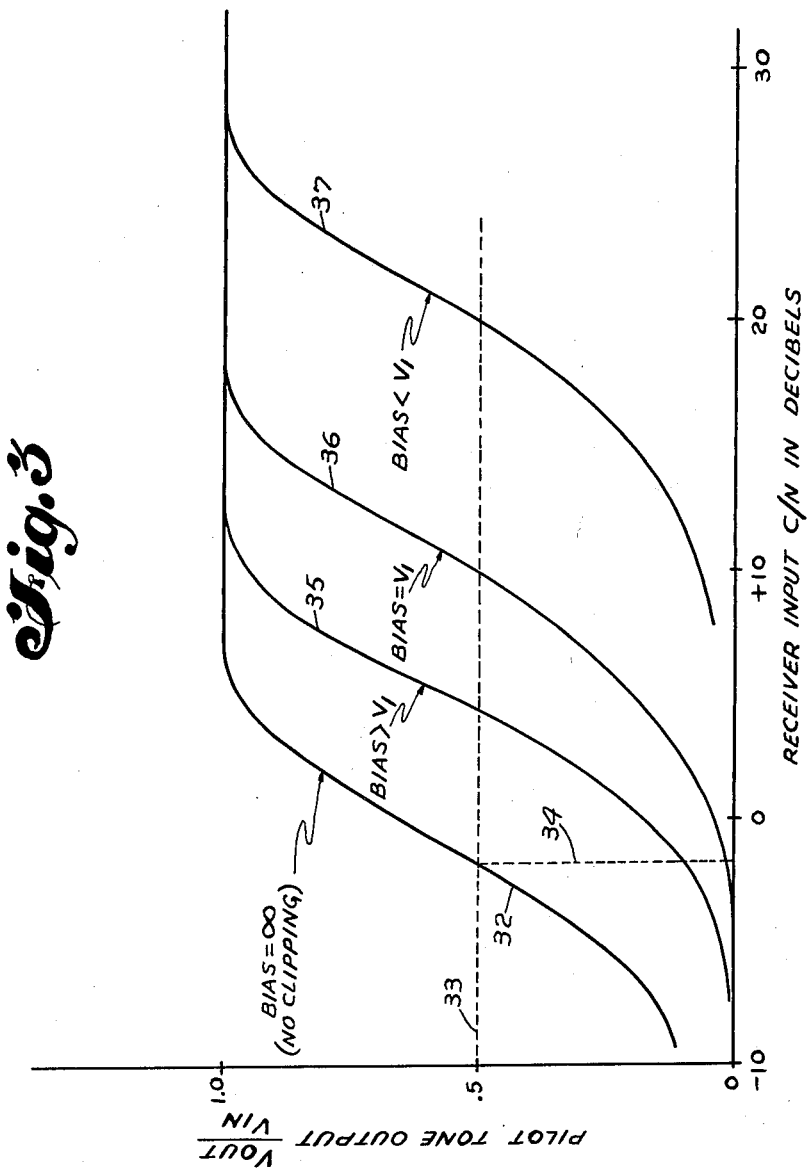

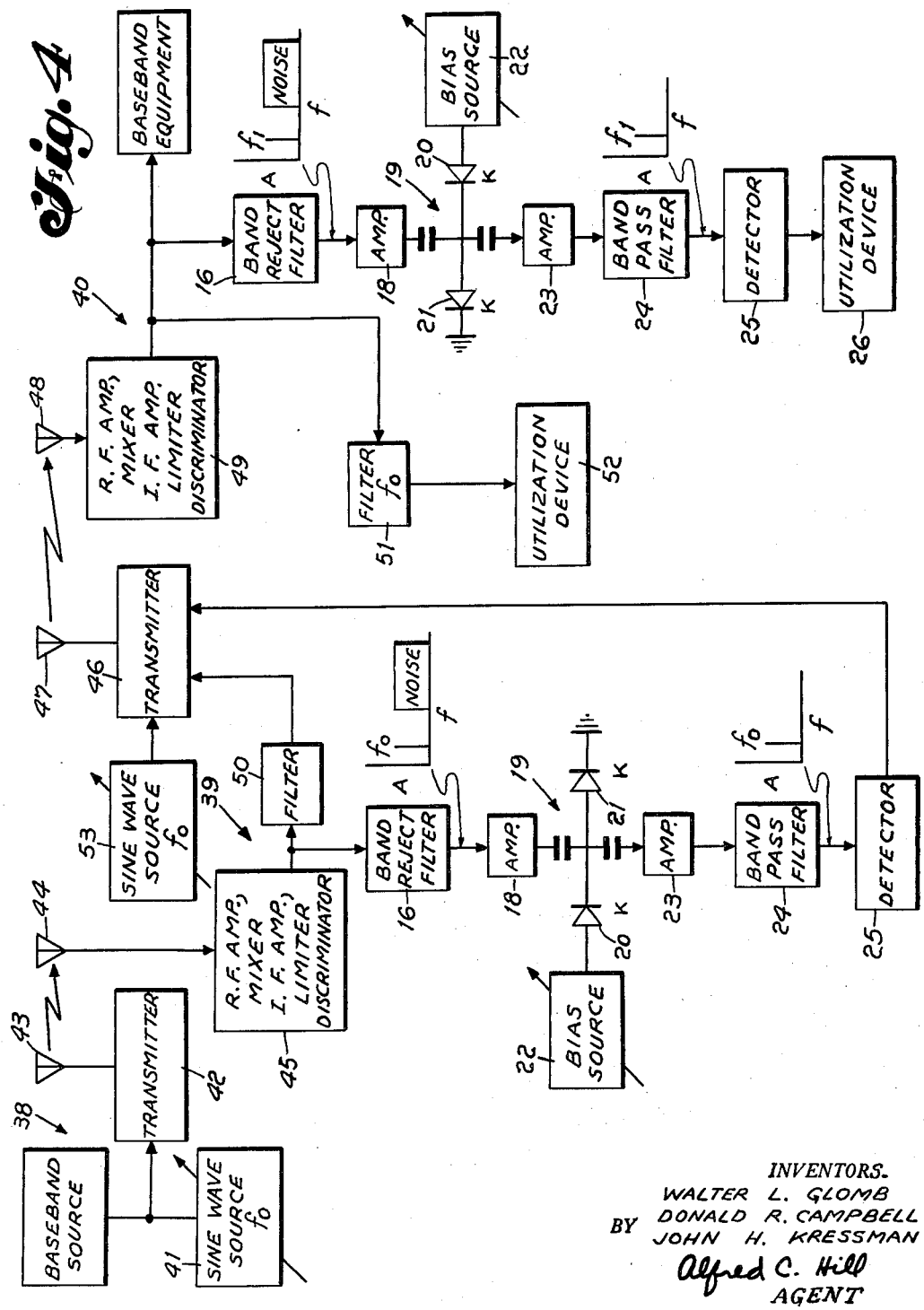

3,101,446
SIGNAL TO NOISE RATIO INDICATOR
Walter L. Glomb, Clifton, and Donald R. Campbell,
Nutley, N.J., and John H. Kressman, Easton, Pa.,
assignors to International Telephone and Telegraph
Corporation, Nutley, N.J., a corporation of Maryland
Filed Sept. 2, 1960, Ser. No. 53,764
20 Claims. (Cl. 325—67)

This invention relates to signal monitoring systems and more particularly to a signal-to-noise ratio indicator.

In the operation of electromagnetic wave propagation systems, such as communication, navigation and surveillance systems, it often becomes desirable to continuously monitor the system signal-to-noise ratio, particularly in the neighborhood of threshold. A signal which is indicative of the signal-to-noise ratio is useful in the determination of system reliability in early phases of operation and can be utilized in subsequent operations as a squelch activating signal. In conjunction with some diversity receiving schemes, the signal indicating the signal-to-noise ratio can also be used to disable a particular receiver when operation below threshold is imminent.

An object of this invention is to provide an improved signal-to-noise ratio indicator.

Another object of this invention is to provide a circuit producing an output signal indicating the signal-to-noise ratio which may be utilized for monitoring, squelch activating, or diversity receiving purposes.

A feature of this invention is the provision of a circuit operable upon the composite sum of a sine wave plus noise to indicate the signal-to-noise ratio of a signal.

Another feature of this invention is a circuit including means responsive to composite sum of a low frequency sine wave disposed below the baseband signal and the high frequency noise disposed above the base band signal to produce a compressed sine wave and means coupled to the responsive means to detect the amplitude of the compressed sine wave, the detected amplitude being the signal indicative of the signal-to-noise ratio of a signal.

The above-mentioned and other features and objects of this invention will become more apparent by reference to the following description taken in conjunction with the accompanying drawings, in which:

FIG. 1 is a schematic diagram in block form of a signal-to-noise ratio indicator in accordance with the principles of this invention;

FIG. 2 is a graphical illustration useful in explaining the operation of the signal-to-noise ratio indicator of FIG. 1;

FIG. 3 is a graphical illustration relating sine wave output and receiver input carrier-to-noise ratio for several values of bias applied to the clipper circuit of FIG. 1;

FIG. 4 is a schematic diagram in block form of a communication system incorporating the signal-to-noise ratio indicator of this invention for evaluation of a multi-hop or multi-link communication system.

Referring to FIG. 1, there is illustrated therein a communication system employing the signal-to-noise ratio indicator of this invention. The communication system is illustrated as including a terminal 1 for transmitting the baseband signal from source 2 by means of transmitter 3 and antenna 4 to a receiving terminal 5. Terminal 5 includes an antenna 6, ratio frequency (RF) amplifier 7, a heterodyning arrangement including mixer 8 and oscillator 9, an intermediate frequency (IF) amplifier 10, a limiter discriminator 11, a baseband amplifier 12 and a baseband utilization device 13. Although, in FIG. 1, the communication system is illustrated to be a radio transmission system, other transmission media, such as a open wire or coaxial cable media may be substituted for a radio transmission medium.

The signal-to-noise ratio of the communication system outlined hereinabove is obtained by employing at terminal 1 a sine wave source to inject a sine wave having a frequency $f_0$ into the input of transmitter 3 for propagation to terminal 5 along with baseband source. The frequency of the sine wave is chosen to be below the band occupied by the baseband signal and, hence, is a low frequency sine wave. In its propagation through the propagation media between antenna 4 and 6, the sine wave and the baseband signal are propagated through the same medium between antennas 4 and 6 in the presence of noise. Thus, if the signal-to-noise ratio of the sine wave is detected, the results will be indicative of the signal-to-noise ratio of the received carrier signal. Therefore, in accordance with the principles of this invention, the signal-to-noise ratio indicator is coupled to the output of limiter discriminator 11 by means of switch 15 in the position illustrated. The output of limiter discriminator 11 is passed through a band reject filter 16 which removes the baseband signal and leaves only the low frequency sine wave and the out of band or high frequency noise as illustrated in the curve 17. The sine wave and the out of band noise are applied to amplifier 18 which has a dynamic range adequate to pass these signals without clipping. The output signal of amplifier 18 is applied to a symmetrical clipper 19 including diodes 20 and 21 and a bias source 22. The amplitude of the bias voltage of source 22 is selected to be at some particular clipping level usually exceeding the peak amplitude of the sine wave alone. Following the clipping, the clipped signal is amplified by amplifier 23 and coupled to band pass filter 24 to extract from the clipped signal the resultant sine wave only, which is compressed in amplitude if noise is present prior to clipping. The output of band pass filter 24 is coupled to detector 25 to detect the amplitude of the resultant sine wave. The output of detector 25 is coupled to a utilization device 26, such as a meter or other indicator, to measure the amplitude of the detected output. The measured output will be an indication of the monitored signal-to-noise and may be translated to an actual signal-to-noise ratio by reference to prepared graphs as hereinafter explained.

Thus, the signal-to-noise ratio indicator of this invention operates on a combination of a low frequency sine wave and out of band noise. It is sensitive to variations in propagation characteristics at the extremities of the traffic band, or in other words the baseband, due to the sine wave being below the band occupied by the baseband and the out of band noise being above the band occupied by the baseband. This choice of operating frequencies provides a measure of protection against frequency selective fading which is characteristic of long range over the horizon propagation. The proposed method essentially operates on the principle that a sine wave in the presence of noise when clipped at some point, preferably exceeding the peak amplitude of the sine wave alone, and filtered to permit only the sine wave component to be measured exhibits compression. This compression is a function of the sine wave amplitude, noise amplitude, and clipping level. Thus, by adjusting the clipping level, a certain compression of the sine wave can be made to correspond to a received carrier-to-noise ratio values in the range from approximately 0 db (decibels) to 20 db or more depending upon the out of band noise available.

Referring to FIG. 2, the operation of the signal-to-noise ratio indicator of this invention is diagrammatically illustrated. Prior to clipping the sine wave, illustrated by the sine wave curve including the dotted portion 27, has superimposed thereon of noise illustrated by curve 28. Thus, at the input of clipper 19 there is present the composite sum of sine wave 27 and noise 28. When this composite sum of signals is passed through the symmetrical clipper 19 with the bias from bias source 22 being appropriately selected, a portion of the noise is removed from the composite waveform. This clipping or removal of a portion of the noise above the peak amplitudes of the sine wave results in a reduction of the energy or amplitude of the sine wave within the composite waveform and, hence, a compressed sine wave as illustrated by curve 29. Filter 24 having a narrow bandpass response then extracts from the clipped composite waveform the resultant compressed sine wave only. The clipping levels are illustrated by lines 30 and 31. Line 30 represents the negative bias voltage of source 22 with the diodes 20 and 21 of clipper 19 poled as indicated and line 31 represents the reference or ground potential applied to the cathode of diode 21.

Under the preferred arrangement, with switch 15 in the position illustrated in FIG. 1, the significant noise band will extend from just above the highest traffic frequency to $\Delta f/2$ where $\Delta f$ is the receiver intermediate frequency bandwidth. In most practical frequency division modulation systems, $\Delta f/2$ will be several times the highest traffic channel frequency. If, however, the output is taken from the output of baseband amplifier 12 by positioning switch 15 in its alternate position, sensitivity may be sacrificed since the baseband amplifier may have a somewhat narrower bandwidth than the $\Delta f/2$ bandwidth in the preferred arrangement. Although the sensitivity is sacrificed, this alternative arrangement may be utilized where greater amplification is required prior to application to the signal-to-noise indicator of this invention.

The operation of the signal-to-noise ratio indicator can be proven, by the more formal rigorous evaluation of the spectral energy distribution of a clipped Rayleigh distribution representing the sum of the sine wave plus noise, or the more informal evaluation represented by a Gaussian distribution with slowly varying mean value clipped at a given level, to be only a function of the ratio of the clipper bias, the magnitude of the output of source 22, and the r.m.s. (root mean square) value of the noise. While in theory this is true, several practical considerations limit the operating range of the device. In a practical frequency modulation system, the lower limit to the operation of the circuit is established by the compression of the modulation in the presence of noise that takes place in the frequency modulation (FM) demodulation process. This curve is represented by $$v = v_0 \left(1 - e^{-\frac{N}{C}}\right)$$

where $v_0$ is the normal output, $v$ is the compressed output, and $N/C$ is the noise power to carrier power ratio. This curve is plotted in FIG. 3 as curve 32 and represents the compression which occurs in an FM system in the absence of any subsequent clipping. In will be noted that this compression reaches 50% at a carrier to noise ratio of −1 db as is indicated by the interception of dotted lines 33 and 34. This compression alone could be used to monitor system performance. However, it is apparent that for most applications, the range of operation is about 10 db lower in carrier to noise ratio than the range of interest. With the introduction of clipping circuit 19, as described hereinabove with respect to FIG. 1, it is possible to simulate compression curves such as indicated by curves 35, 36 and 37 where curve 35 is for a clipping bias greater than $v_1$, curve 36 is for a clipping bias equal to $v_1$, and curve 37 is for a clipping bias less than $v_1$, where $v_1$ equals the peak amplitude of the sine wave at the input of clipper 19. The upper range of carrier to noise ratio is limited by the amount of noise available and the magnitude of the sine wave. Since the clipping level cannot be made less than the peak sine wave amplitude without resulting in compression in the absence of noise, then the maximum value of carrier to noise ratio at which the circuit will cause 50% compression is that at which the r.m.s. value of noise is equal to 0.707 of the peak amplitude of the sine wave and the clipper bias is set to equal the peak of the sine wave. For example, for a system having a 30 kc. (kilocycles) IF bandwidth and a since wave at 8 kc. with deviation of ±12.5 kc. peak, assuming a post detection noise bandwidth of 50 kc. to 150 kc., then the maximum carrier to noise ratio is calculated at +15 db.

If additional sensitivity is required, a reduced amplitude sine wave can be used and the bias correspondingly reduced. The maximum range of operation of the indicator circuit is obtained when the amplitude of the sine wave is as small as possible.

The description hereinabove has been concerned with the evaluation of the signal-to-noise ratio or received carrier to noise ratio on a single link of a communication system as depicted in FIG. 1. The signal-to-noise ratio indicator of this invention may be utilized to evaluate at a given terminal a plurality of communication hops connected in a tandem arrangement such as indicated in FIG. 4. Referring to FIG. 4, there is illustrated therein a plurality of hops including terminal 38, a terminal 39, and a terminal 40 connected in a tandem arrangement. It is to be understood that more than the number of terminals illustrated may be included in the communication system and the system evaluated as outlined hereinbelow for the two hops illustrated in FIG. 4. By inserting the sine wave signal at terminal 38 from source 41, it is possible to evaluate the signal-to-noise ratio of either the hop between terminals 38 and 39 or the composite signal-to-noise ratio of the entire system from terminal 38 to terminal 40.

Consider first the employment of a single sine wave such as the output of source 41, to evaluate the entire system. An approximate evaluation of the signal-to-noise ratio is obtained by transmitting the sine wave along with the baseband signal from terminal 38 to terminal 39 wherein the signal is transmitted from transmitter 42 to an antenna 43 and, hence, to antenna 44 and receiver 45. Receiver 45 is illustrated as including an RF amplifier, mixer, IF amplifier, and limiter discriminator. The output of the limiter discriminator is coupled to the signal-to-noise ratio indicator including band reject filter 16, amplifier 18, clipper circuit 19, amplifier 23, and band pass filter 24, and detector 25 as described hereinabove with respect to FIG. 1. When the compressed sine wave signal is detected in detector 25, the detected amplitude is coupled to transmitter 46 of terminal 39 and coupled from antenna 47 to antenna 48 of terminal 40. Terminal 40 includes a receiver 49, also including an RF amplifier, mixer, IF amplifier, and limiter discriminator. The sine wave having a frequency $f_0$ would then be detected again in another indicator including band rejection filter 16 and so forth as was described in connection with FIG. 1. The resultant detected sine wave is coupled to the utilization device which could be a meter to provide an approximate evaluation of the signal-to-noise ratio of the entire system from terminals 38 to 40. This arrangement cannot, however, give the identity of the fading hop and the results are no longer unique. This latter effect results from the fact that the resulting compression is non-linear and the compression of a signal in one hop substantially effects the critical carrier-to-noise ratio at which compression occurs in subsequent hop.

The following arrangement would be employed to evaluate the individual hops of the communication system permitting the identification of the hop that is fading or approaching threshold. As before, the output from sine wave source 41 would be transmitted to terminal 39 wherein the signal-to-noise ratio would be indicated by employing the sine wave having a frequency $f_0$ and the out of band noise as described before in connection with FIG. 1. Filter 50 rejects the sine wave having a frequency $f_0$ so that spacious information is not transmitted through terminal 39. The detected amplitude of the compressed sine wave would be transmitted from terminal 39 to terminal 40 and this signal would be detected in filter 51 and coupled to utilization device 52 to give an indication of the signal-to-noise ratio present in the communication hop between terminals 38 and 39. At terminal 39, a second sine wave having a frequency $f_1$ which is different than the frequency $f_0$ of the signal coupled from source 41 would be supplied from source 53 for transmission from terminal 39 to terminal 40. After its transmission and reception at terminal 40, the sine wave $f_1$ would be passed through band reject filter 16, amplifier 18, clipper 19, amplifier 23, band pass filter 24, and detector 25, and hence to the utilization device 26 which would give an indication of the signal-to-noise ratio in the communication hop between terminals 39 and 40. Thus, at terminal 40, by utilizing sine waves having distinct frequencies for each of the communication hops, it is possible to evaluate the signal-to-noise ratio of each hop and identify which of the hops is approaching threshold by incorporating at each of the appropriate terminals a signal-to-noise ratio detector as described in connection with FIG. 1 and transmitting the detected amplitude of the compressed sine wave through subsequent hops to the terminal 40.

While we have described above the principles of our invention in connection with specific apparatus, it is to be clearly understood that this description is made only by way of example and not as a limitation to the scope of our invention as set forth in the objects thereof and in the accompanying claims.

We claim:

1. A circuit to indicate the signal-to-noise ratio of a signal in the presence of noise, said signal including a sine wave, comprising means responsive to the composite sum of said sine wave and said noise to produce a resultant signal including said sine wave compressed in amplitude proportional to the amplitude of said noise, and means coupled to said responsive means to detect the amplitude of said compressed sine wave.

2. A circuit to indicate the signal-to-noise ratio of a signal in the presence of noise, said signal including a low frequency sine wave, comprising means responsive to the composite sum of said sine wave and the high frequency components of said noise to produce a resultant signal including said sine wave compressed in amplitude proportional to the amplitude of said noise, and means coupled to said responsive means to detect the amplitude of said compressed sine wave.

3. A circuit to indicate the signal-to-noise ratio of a signal in the presence of noise, said signal including a sine wave, comprising means responsive to the composite sum of said sine wave and said noise to produce a resultant signal including said sine wave compressed in amplitude proportional to the amplitude of said noise, means coupled to said responsive means to recover said compressed sine wave, and means to detect the amplitude of said recovered compressed sine wave.

4. A circuit to indicate the signal-to-noise ratio of a signal in the presence of noise, said signal including a low frequency sine wave, comprising means responsive to the composite sum of said sine wave and the high frequency components of said noise to produce a resultant signal including said sine wave compressed in amplitude proportional to the amplitude of said noise, means coupled to said responsive means to recover said compressed sine wave, and means to detect the amplitude of said recovered compressed sine wave.

5. A circuit to indicate the signal-to-noise ratio of a signal in the presence of noise, said signal including a sine wave, comprising means to clip the composite sum of said sine wave and said noise at a predetermined level equal to or greater than the peak level of said sine wave, means coupled to said clipping means to recover the resultant sine wave, and means to detect the amplitude of said resultant sine wave.

6. A circuit to indicate the signal-to-noise ratio of a signal in the presence of noise, said signal including a low frequency sine wave, comprising means to clip the composite sum of said sine wave and the high frequency components of said noise at a predetermined level equal to or greater than the peak level of said sine wave, means coupled to said clipping means to recover the resultant sine wave, and means to detect the amplitude of said resultant sine wave.

7. A circuit to indicate the signal-to-noise ratio of a signal in the presence of noise, said signal including a low frequency sine wave, comprising a filter to pass said sine wave and the high frequency components of said noise, a symmetrical clipper coupled to the output of said filter to clip the composite sum of said sine wave and said high frequency components at a predetermined level equal to or greater than the peak level of said sine wave, and means coupled to said clipper to detect the amplitude of the resultant sine wave.

8. A circuit to indicate the signal-to-noise ratio of a signal in the presence of noise, said signal including a low frequency sine wave, comprising a first filter to pass said sine wave and the high frequency components of said noise, a symmetrical clipper coupled to said first filter to clip the composite sum of said sine wave and said high frequency components at a predetermined level equal to or greater than the peak level of said sine wave, a second filter coupled to the output of said clipper to pass only the resultant sine wave, and a detector coupled to the output of said second filter to detect the amplitude of said resultant sine wave.

9. A circuit to indicate the signal-to-noise ratio of a signal in the presence of noise, said signal including a low frequency sine wave, comprising a filter to pass said sine wave and the high frequency components of said noise, a symmetrical clipper coupled to the output of said filter, a bias source, means coupling the bias of said bias source to said clipper to establish a clipping level for said clipper at a predetermined level equal to or greater than the peak level of said sine wave, and means coupled to the output of said clipper to detect amplitude of the resultant sine wave.

10. A circuit to indicate the signal-to-noise ratio of a signal in the presence of noise, said signal including a low frequency sine wave, comprising a first filter to pass said sine wave and the high frequency components of said noise, a symmetrical clipper coupled to the output of said first filter, a bias source, means coupling the bias of said bias source to said clipper to eestablish a predetermined clipping level equal to or greater than the peak level of said sine wave, a second filter coupled to the output of said clipper to recover the resultant sine wave, and a detector coupled to said second filter to detect the amplitude of said resultant sine wave.

11. A system to indicate the signal-to-noise ratio of signal in the presence of noise comprising means to inject a sine wave into said signal, means responsive to the composite sum of said sine wave and said noise to produce a resultant signal including said sine wave compressed in amplitude proportional to the amplitude of said noise, and means coupled to said responsive means to detect the amplitude of said compressed sine wave.

12. A system to indicate the signal-to-noise ratio of signal in the presence of noise comprising means to inject a sine wave into said signal, means responsive to the composite sum of said sine wave and said noise to produce a resultant signal including said sine wave compressed in amplitude proportional to the amplitude of said noise, means coupled to said responsive means to recover said compressed sine wave, and means to detect the amplitude of said recovered compressed sine wave.

13. A system to indicate the signal-to-noise ratio of a signal in the presence of noise comprising means to inject a sine wave into said signal, means responsive to the composite sum of said sine wave and said noise for clipping thereof at a predetermined level equal to or greater than the peak level of said sine wave, means coupled to said clipping means to recover the resultant sine wave, and means to detect the amplitude of said resultant sine wave.

14. A system to indicate the signal-to-noise ratio of a signal in the presence of noise comprising means to inject a low frequency sine wave into said input signal, means responsive to the composite sum of said sine wave and the high frequency components of said noise for clipping thereof at a predetermined level equal to or greater than the peak level of said sine wave, means coupled to said clipping means to recover the resultant sine wave, and means to detect the amplitude of said resultant sine wave.

15. In a communication system having at least a pair of terminals for propagating a communication signal therebetween in the presence of noise, a system to indicate the signal-to-noise ratio of said communication signal comprising a source of sine wave disposed at one of said terminals, means to propagate said sine wave to the other of said terminals, means disposed in said other of said terminals responsive to the composite sum of said sine wave and said noise to produce a resultant signal including said sine wave compressed in amplitude proportional to the amplitude of said noise, and means coupled to said responsive means to detect the amplitude of said compressed sine wave.

16. In a communication system having at least a pair of terminals for propagating a communication signal therebetween in the presence of noise, a system to indicate the signal-to-noise ratio of said communication signal comprising a source of sine wave disposed at one of said terminals, means to propagate said sine wave to the other of said terminals, means disposed in said other of said terminals responsive to the composite sum of said sine wave and said noise for clipping thereof at a predetermined level equal to or greater than the peak level of said sine wave, means coupled to said clipping means to recover the resultant sine wave, and means to detect the amplitude of said resultant sine wave.

17. In a communication system having at least a pair of terminals for propagating a communication signal therebetween in a given band in the presence of noise, a system to indicate the signal-to-noise ratio of said communication signal comprising a source of sine wave disposed at one of said terminals, said sine wave having a frequency less than said given band, means to propagate said communication signal and said sine wave to the other of said terminals, means disposed in said other of said terminals responsive to the composite sum of said sine wave and the frequency component of said noise above said band for clipping thereof at a predetermined level equal to or greater than the peak level of said sine wave, means coupled to said clipping means to recover the resultant sine wave, and means to detect the amplitude of said resultant sine wave.

18. In a communication system having at least a pair of terminals for propagating a communication signal therebetween in a given band in the presence of noise, a system to indicate the signal-to-noise ratio of said communication signal comprising a source of sine wave disposed at one of said terminals, said sine wave having a frequency less than said band, means to propagate said sine wave and said communication signal to the other of said terminals, a first filter disposed in the other of said terminals to pass said sine wave and the frequency components of said noise above said band, a symmetrical clipper coupled to said first filter, a bias source, means coupling the bias of said bias source to said clipper to establish a predetermined clipping level equal to or greater than the peak level of said sine wave, a second filter coupled to the output of said clipper to pass the resultant sine wave, and a detector coupled to the output of said second filter to detect the amplitude of said resultant sine wave.

19. In a communication system having a plurality of terminals for propagating a communication signal in the presence of noise, a system to indicate the signal-to-noise ratio of said communication signal including a source of sine wave disposed at the first of said terminals, means to propagate said sine wave and said communication signal through the other of said terminals to the last of said terminals, means disposed in said last of said terminals responsive to the composite sum of said sine wave and said noise to produce a resultant signal including said sine wave compressed in amplitude proportional to the amplitude of said noise, and means coupled to said responsive means to detect the amplitude of said compressed sine wave.

20. In a communication system having a plurality of terminals for propagating a communication signal in the presence of noise, a system to indicate the signal-to-noise ratio of said communication signal including a source of sine wave disposed at each of said terminals except the last, the frequency of each of said sine waves being spaced one from the other, means to propagate said communication signal and the sine wave associated with each of said terminals to the next adjacent terminal, means disposed at each of said terminals except the first responsive to the composite sum of the sine wave received and said noise to produce a compressed sine wave, means coupled to said responsive means to detect the amplitude of said compressed sine wave, means to couple each of said detected compressed sine wave to the last of said terminals, and means disposed at the last of said terminals responsive separately to each of said detected compressed sine wave signal to indicate the signal-to-noise ratio of said communication signal between adjacent ones of said terminals.

References Cited in the file of this patent
UNITED STATES PATENTS

| | | |
|---|---|---|
| 2,674,690 | Arbuimbau et al. | Apr. 6, 1954 |
| 2,678,383 | Frantz | May 11, 1954 |
| 2,958,822 | Rogers et al. | Nov. 1, 1960 |